(12) United States Patent
Lin et al.

(10) Patent No.: US 10,355,490 B2
(45) Date of Patent: Jul. 16, 2019

(54) HYBRID SOLAR POWER GENERATION SYSTEM

(71) Applicant: CYBER POWER SYSTEMS, INC., Taipei (TW)

(72) Inventors: Yu-Chih Lin, Taipei (TW); Cheng-Wei Chu, Taipei (TW); Shih-Heng Guo, Taipei (TW)

(73) Assignee: CYBER POWER SYSTEMS, INC., Taipei (TW)

( * ) Notice: Subject to any disclaimer, the term of this patent is extended or adjusted under 35 U.S.C. 154(b) by 240 days.

(21) Appl. No.: 15/187,086

(22) Filed: Jun. 20, 2016

(65) Prior Publication Data
US 2017/0033564 A1   Feb. 2, 2017

(30) Foreign Application Priority Data

Jul. 28, 2015  (TW) .............................. 104124332 A (51) Int. Cl.
| | | |
|---|---|---|
| H01M 10/44 | (2006.01) | |
| H02J 3/38 | (2006.01) | |
| H02J 7/00 | (2006.01) | |
| H02S 40/32 | (2014.01) | |
| H02S 40/34 | (2014.01) | |
| H02S 40/38 | (2014.01) | |
| H02S 10/20 | (2014.01) | |
| H02S 10/12 | (2014.01) | |
| H02J 7/35 | (2006.01) | |

(52) U.S. Cl.
CPC ............ *H02J 3/385* (2013.01); *H02J 7/0068* (2013.01); *H02J 7/35* (2013.01); *H02S 10/12* (2014.12); *H02S 10/20* (2014.12); *H02S 40/32* (2014.12); *H02S 40/34* (2014.12); *H02S 40/38* (2014.12); *Y02E 10/58* (2013.01)

(58) Field of Classification Search
CPC . H02J 3/385; H02J 7/0068; H02J 7/35; H02S 10/12; H02S 10/20; H02S 40/32; H02S 40/34; H02S 40/38; Y02E 10/58
USPC ....................................... 320/101; 307/43, 87
See application file for complete search history.

(56) References Cited

U.S. PATENT DOCUMENTS

| | | | |
|---|---|---|---|
| 6,914,418 B2 | 7/2005 | Sung | |
| 2011/0298288 A1* | 12/2011 | Cho | .................... H01M 10/465 307/70 |
| 2012/0047386 A1* | 2/2012 | Matsui | ................ H01M 10/465 713/340 |

(Continued)

FOREIGN PATENT DOCUMENTS

| | | |
|---|---|---|
| CN | 1521915 A | 8/2004 |
| TW | 591847 B | 6/2004 |

*Primary Examiner* — Richard Isla
*Assistant Examiner* — Mohammed J Sharief
(74) *Attorney, Agent, or Firm* — Bacon & Thomas, PLLC (57) ABSTRACT

A hybrid solar power generation system includes at least one solar panel, at least one first switch, a rectifying control unit, at least one rechargeable battery, a DC (Direct Current) to AC (Alternating Current) inverter, at least one second switch, and a DC to DC charging unit and a system control unit; wherein the system control unit controls the first switch and the second switch to form a grid-tied path and a standalone path, the solar panel supplies power to a utility grid by the grid-tied path, and the solar panel supplies power to an AC load by the standalone path.

15 Claims, 8 Drawing Sheets

(56) References Cited

U.S. PATENT DOCUMENTS

| | | | |
|---|---|---|---|
| 2012/0256581 A1* | 10/2012 | Lee | H02J 1/14 320/101 |
| 2013/0076301 A1* | 3/2013 | Bastami | H02J 7/0008 320/107 |
| 2014/0117756 A1* | 5/2014 | Takahashi | H02J 3/383 307/23 |
| 2015/0263638 A1* | 9/2015 | Yang | H02M 7/04 363/125 |
| 2016/0301231 A1* | 10/2016 | Cho | H02J 7/0068 |

* cited by examiner

HYBRID SOLAR POWER GENERATION SYSTEM

BACKGROUND OF THE INVENTION

1. Field of the Invention

The invention relates to a hybrid solar power generation system, and more particularly to a solar power generation system uses a plurality of switches to achieve a grid-tied path and a standalone path, the solar power generation system having at least one solar panel and a rechargeable battery, and the rechargeable battery using at least one of the switches to switch to connect the grid-tied path or the standalone path.

2. Description of Related Art

A prior-art is disclosed in U.S. Pat. No. 6,914,418 (its patent family has Taiwan Patent No. TW591847 and China Patent No. CN1521915A), the prior-art disclosed a multi-mode renewable power converter system, the system includes a control unit, a boost converter, an inverter and an optional bi-directional charger, wherein the boost converter is connected to the DC (Direct Current) output of a renewable power source, the boost converter converts a low voltage DC power to high voltage DC, the high voltage DC is outputted to the inverter and the bi-directional charger. The system is suitable to select the different function mode, because the control unit connects with a load, the inverter and the bi-directional charger. Therefore, the inverter is suitable to be applied to the different load, such as a standalone load or a grid-connected load.

When the prior-art is charging a battery, power energy generated by a solar panel must pass through the boost converter and the bi-directional charger, and then charges the battery. Thus, the prior-art has more power transformation loss. Moreover, when the solar panel is not generating power, power energy of the battery must pass through the bi-directional charger, which then supplies power to the control unit. Thus, power consumption of the battery will be faster, and that has more power transformation loss. Furthermore, when the system dose supply power to a standalone load, power energy of the battery must pass through the bi-directional charger and the inverter, and then supplies power to the standalone load. Thus, power consumption of the battery will be faster, and that has more power transformation loss.

Based on the above problems, the prior-art still needs to improvement, thereby increase the usage rate of the solar panel power generation and the usage rate of the battery power.

SUMMARY OF THE INVENTION

It is therefore an object of the invention to provide a hybrid solar power generation system, the solar power generation system including at least one solar panel, at least one first switch, a rectifying control unit, at least one rechargeable battery, a DC to AC (Alternating Current) inverter, at least one second switch, a DC to DC charging unit and a system control unit; wherein the system control unit controls the first switch and the second switch to form a grid-tied path and a standalone path, the solar panel supplies power to a utility grid by the grid-tied path, and the solar panel supplies power to an AC load by the standalone path.

It is therefore another object of the invention to provide a hybrid solar power generation system, the solar power generation system comprises at least one solar panel, at least one first switch, a rectifying control unit, at least one rechargeable battery, a DC to AC (Alternating Current) inverter, at least one second switch, a DC to DC charging unit, a system control unit, an Aux power (Auxiliary power) unit and at least one third switch; wherein the Aux power unit transforms power energy and supplies power to the system control unit, the third switch switches the connection of the rechargeable battery and the Aux power unit, the system control unit controls the first switch and the second switch to form a grid-tied path, a first standalone path and a second standalone path.

A first advantage of the invention is that, when the solar panel is generating power, the solar panel directly charges the rechargeable battery by the DC to DC charging unit. Thus, the power transformation loss of the invention will be less when the rechargeable battery is charged.

A second advantage of the invention is that, when the solar panel is not generating power, the rechargeable battery uses the Aux power unit to transform power energy and supply power to the system control unit, the supply current does not pass through the DC to DC charging unit. Thus, the power consumption of the rechargeable battery will be slow when the rechargeable battery is supplying current to the system control unit, and the power transformation loss of the invention will be less when the rechargeable battery is supplying current to the system control unit.

A third advantage of the invention is that, the power transformation loss of the rectifying control unit is smaller than the power transformation loss of the DC to DC charging unit. When the invention is applied to an AC load, the rechargeable battery just uses the rectifying control unit and the DC to AC inverter to directly supply power to the AC load, the supply current does not pass through the DC to DC charging unit. Thus, the power consumption of the rechargeable battery will be slow when the rechargeable battery is supplying current to the AC load, and the power transformation loss of the invention will be less when the rechargeable battery is supplying current to the AC load.

The above and other objects, features and advantages of the invention will become apparent from the following detailed description taken with the accompanying drawings.

DETAILED DESCRIPTION OF THE INVENTION

Figure 1:
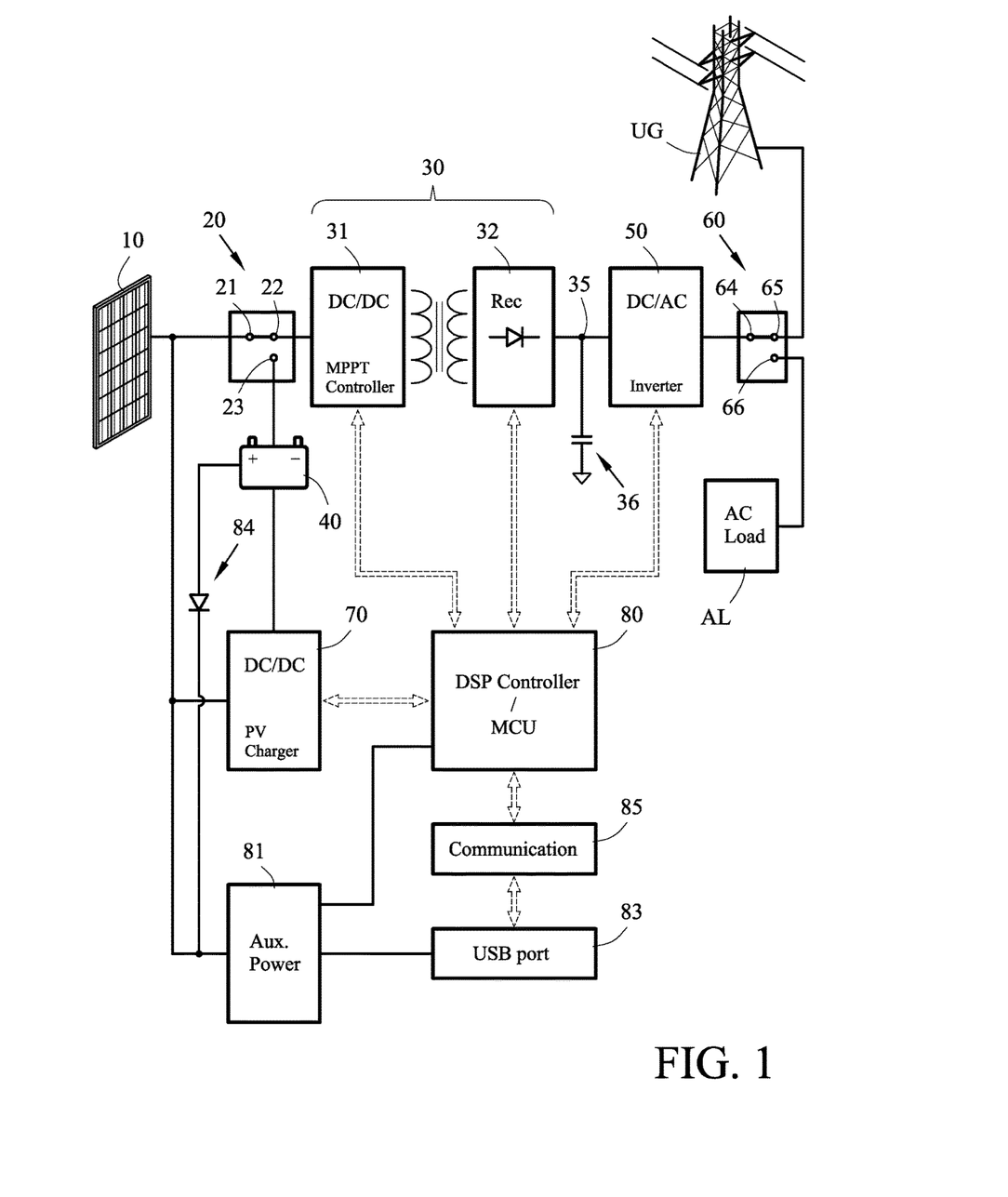
FIG. 1 is a functional block diagram illustrating a first preferred embodiment of the invention.
Figure 2:
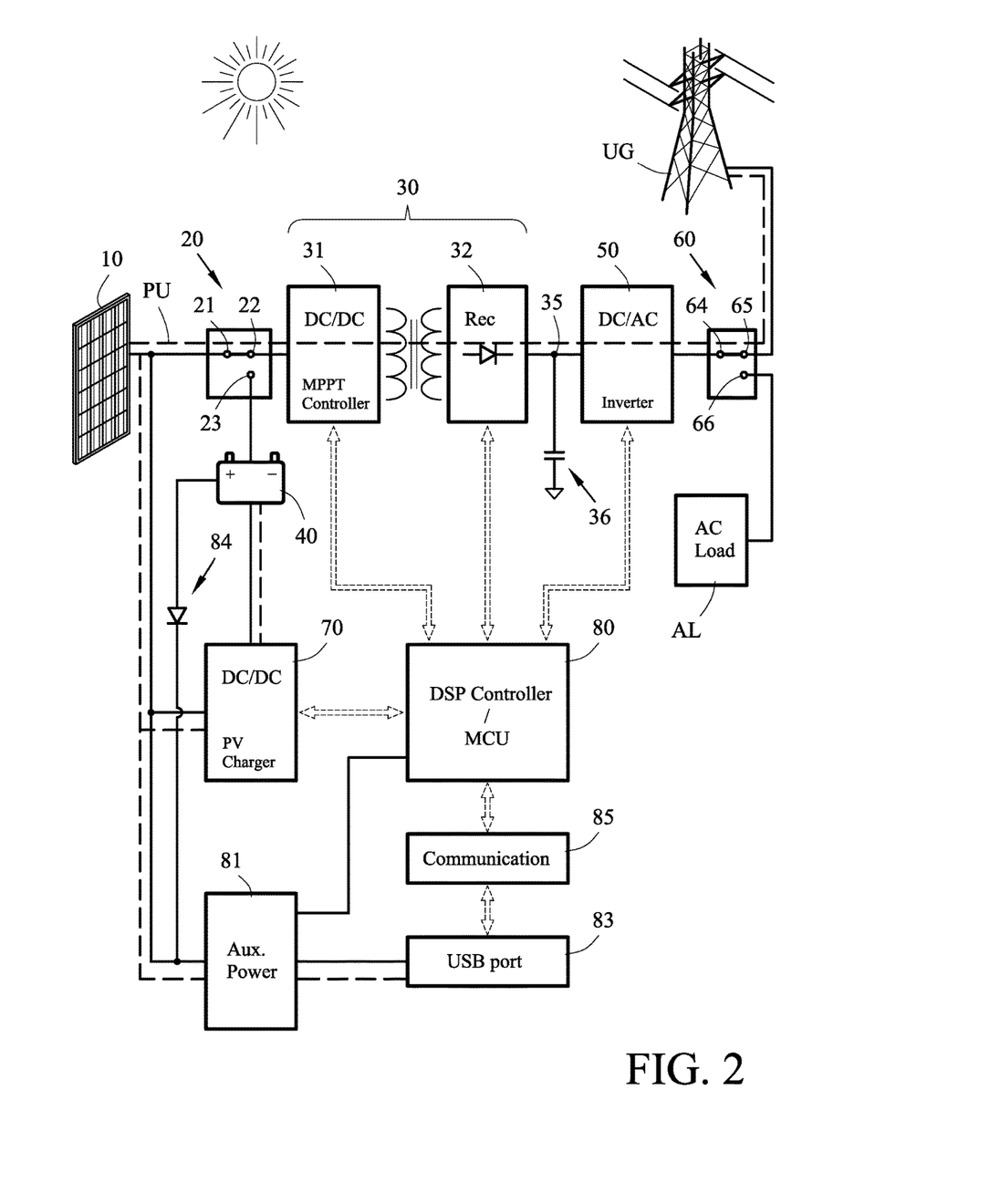
FIG. 2 is a grid-tied path diagram illustrating the first embodiment of the invention.
Figure 3:
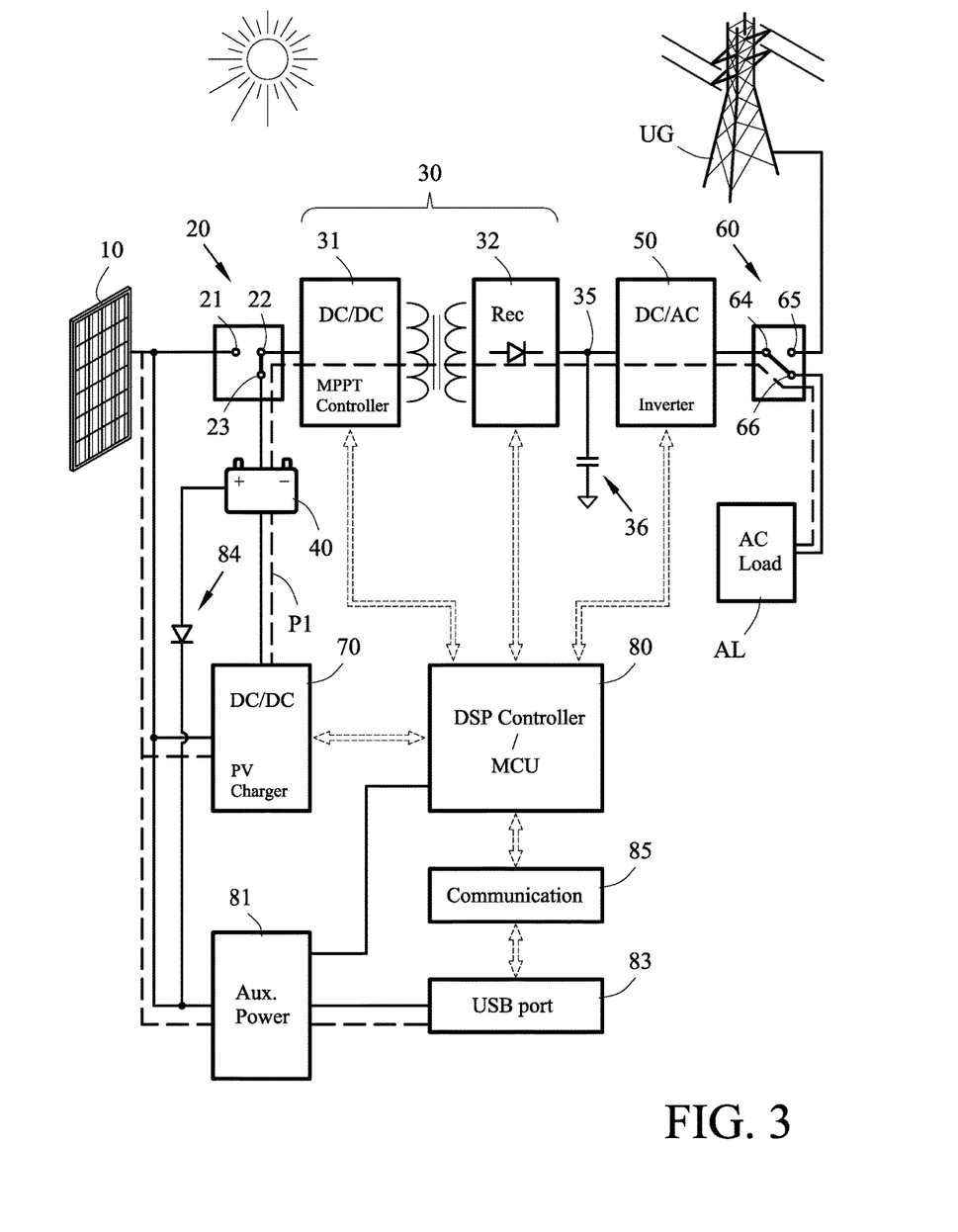
FIG. 3 is a first standalone path diagram illustrating the first embodiment of the invention.

Referring to FIGS. 1 to 3, a hybrid solar power generation system in accordance with a first embodiment of the invention comprises at least one solar panel 10, at least one first switch 20, a rectifying control unit 30, at least one rechargeable battery 40, a DC to AC inverter 50, at least one second switch 60, a DC to DC charging unit 70 and a system control unit 80; the first switch 20 is electrically connected to the solar panel 10, the rectifying control unit 30 is electrically connected to the first switch 20, the rechargeable battery 40 is electrically connected to the first switch 20, the DC to AC inverter 50 is electrically connected to the rectifying control unit 30, the second switch 60 is electrically connected to the DC to AC inverter 50, the DC to DC charging unit 70 is parallelly connected to the solar panel 10, the rechargeable battery 40 is charged by the DC to DC charging unit 70; the system control unit 80 controls the first switch 20, the rectifying control unit 30, the DC to AC inverter 50, the second switch 60 and the DC to DC charging unit 70; wherein the system control unit 80 can control controls the first switch 20 and the second switch 60 to form a grid-tied path PU and a first standalone path P1, the solar panel 10 supplies power to a utility grid UG by the grid-tied path PU, and the solar panel 10 supplies power to an AC load AL by the first standalone path P1.

Examples of an executing manner of the first switch 20 and the second switch 60, the first switch 20 has a first contact 21, a second contact 22 and a third contact 23, the first contact 21 is electrically connected to the solar panel 10, the second contact 22 is electrically connected to the rectifying control unit 30, the third contact 23 is electrically connected to the rechargeable battery 40; the second switch 60 has a fourth contact 64, a fifth contact 65 and a sixth contact 66, the fourth contact 64 is electrically connected to the DC to AC inverter 50, the fifth contact 65 is electrically connected to the utility grid UG, the sixth contact 66 is electrically connected to the AC load AL.

Examples of an executing manner of the grid-tied path PU and the first standalone path P1, the grid-tied path PU is beginning from the solar panel 10, and then through the first contact 21, the second contact 22 which is connected to the first contact 21, the rectifying control unit 30, the DC to AC inverter 50, the fourth contact 64, and the fifth contact 65 which is connected to the fourth contact 64; the first standalone path P1 is beginning from the solar panel 10, and then through the DC to DC charging unit 70, the rechargeable battery 40, the third contact 23, the second contact 22 which is connected to the third contact 23, the rectifying control unit 30, the DC to AC inverter 50, the fourth contact 64, and the sixth contact 66 which is connected to the fourth contact 64.

Figure 4:
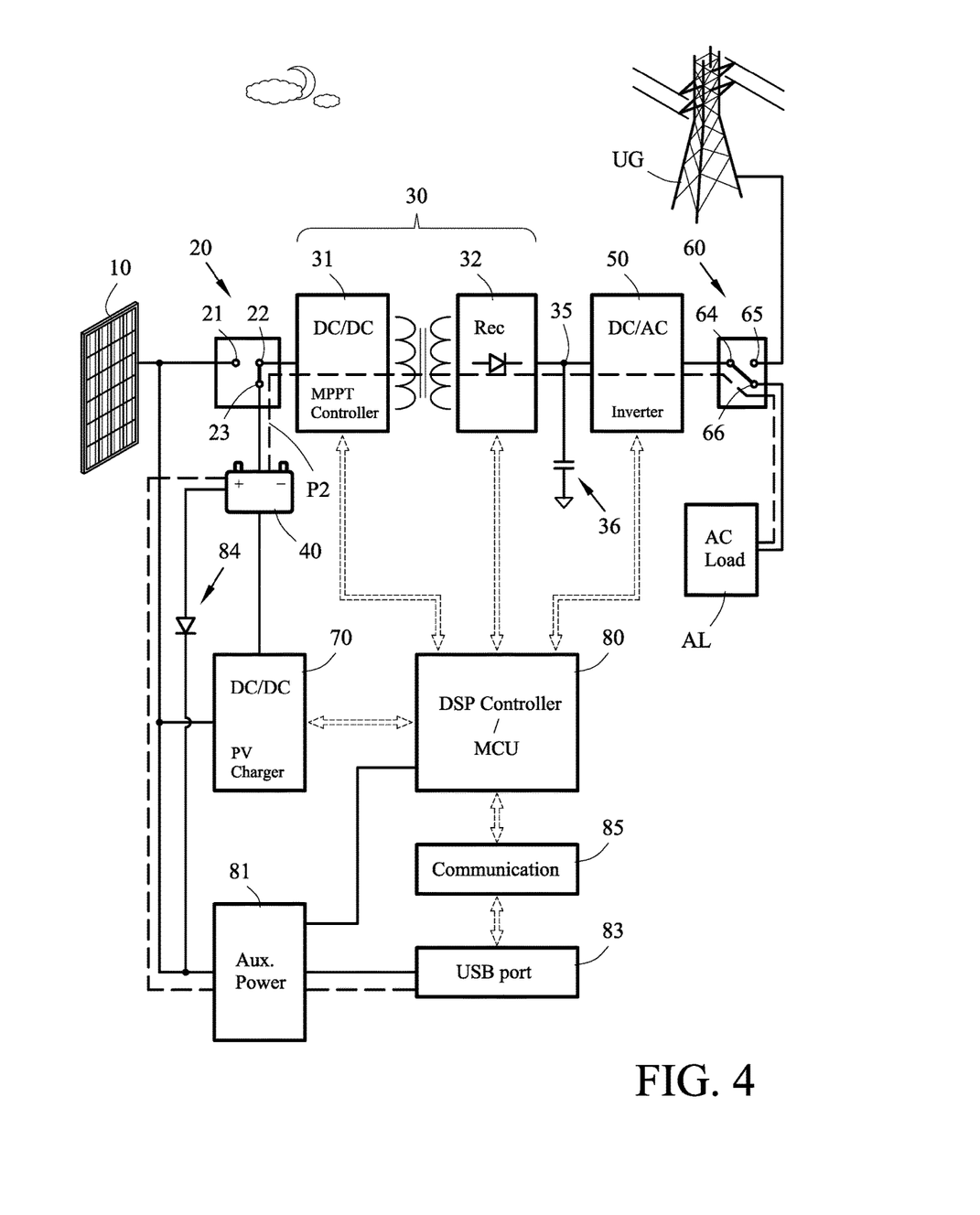
FIG. 4 is a second standalone path diagram illustrating the first embodiment of the invention.

Referring to FIG. 4, in the first embodiment, the system control unit 80 further controls a second standalone path P2 which is formed by the first switch 20 and the second switch 60; the rechargeable battery 40 supplies power to the AC load AL by the second standalone path P2; wherein the second standalone path P2 is beginning from the rechargeable battery 40, and then through the third contact 23, the second contact 22 which is connected to the third contact 23, the rectifying control unit 30, the DC to AC inverter 50, the fourth contact 64, and the sixth contact 66 which is connected to the fourth contact 64.

Referring to FIGS. 1 to 4, in the first embodiment, the system control unit 80 is selected from a DSP (Digital Signal Processor) or a MCU (Microcontroller Unit), the rectifying control unit 30 has a MPPT (Maximum Power Point Tracking) controller 31 and a rectifying circuit 32; wherein the MPPT controller 31 is electrically connected to the second contact 22, the rectifying circuit 32 is electrically connected to the DC to AC inverter 50; and furthermore a V-bus (bus voltage) terminal 35 is located between the rectifying control unit 30 and the DC to AC inverter 50, the V-bus terminal 35 is electrically connected to an electric capacitor 36.

Examples of a power supply way of the system control unit 80, an Aux power (Auxiliary power) unit 81 is parallelly connected to the solar panel 10 and the rechargeable battery 40; at least one unidirectional diode 84 is disposed between the rechargeable battery 40 and the Aux power unit 81, therefore the rechargeable battery 40 and the Aux power unit 81 conducts current only in one direction; when the solar panel 10 is generating power, the Aux power unit 81 transforms the partial power which is generated from the solar panel 10, therefore the Aux power unit 81 supplies power to the system control unit 80; when the solar panel 10 is not generating power, the Aux power unit 81 transforms the partial power of the rechargeable battery 40, therefore the Aux power unit 81 supplies power to the system control unit 80.

Examples of an executing manner of the Aux power unit 81, the Aux power unit 81 electrically connects at least one USB (Universal Serial Bus) port 83; a communication unit 85 is disposed between the system control unit 80 and the USB port 83, therefore the USB port 83 supplies power to charge an external device (not shown).

Referring to FIGS. 5 to 8, a hybrid solar power generation system in accordance with a second embodiment of the invention comprises at least one solar panel 10, at least one first switch 20, a rectifying control unit 30, at least one rechargeable battery 40, a DC to AC inverter 50, at least one second switch 60, a DC to DC charging unit 70, a system control unit 80, an Aux power unit 81 and at least one third switch 88; the first switch 20 is electrically connected to the solar panel 10, the rectifying control unit 30 is electrically connected to the first switch 20, the rechargeable battery 40 is electrically connected to the first switch 20, the DC to AC inverter 50 is electrically connected to the rectifying control unit 30, the second switch 60 is electrically connected to the DC to AC inverter 50, the DC to DC charging unit 70 is parallelly connected to the solar panel 10, the rechargeable battery 40 is charged by the DC to DC charging unit 70; the system control unit 80 controls the first switch 20, the rectifying control unit 30, the DC to AC inverter 50, the second switch 60 and the DC to DC charging unit 70; the Aux power unit 81 is parallelly connected to the solar panel 10 and the rechargeable battery 40; the third switch 88 is disposed between the rechargeable battery 40 and the Aux power unit 81; wherein the Aux power unit 81 transforms power energy and supplies power to the system control unit 80, the third switch 88 switches the connection of the rechargeable battery 40 and the Aux power unit 81, the system control unit 80 controls the first switch 20 and the second switch 60 to form a grid-tied path PU, a first standalone path P1 and a second standalone path P2.

Examples of an executing manner of the first switch 20 and the second switch 60, the first switch 20 has a first contact 21, a second contact 22 and a third contact 23, the first contact 21 is electrically connected to the solar panel 10, the second contact 22 is electrically connected to the rectifying control unit 30, the third contact 23 is electrically connected to the rechargeable battery 40; the second switch 60 has a fourth contact 64, a fifth contact 65 and a sixth contact 66, the fourth contact 64 is electrically connected to the DC to AC inverter 50, the fifth contact 65 is electrically connected to the utility grid UG, the sixth contact 66 is electrically connected to the AC load AL.

Figure 6:
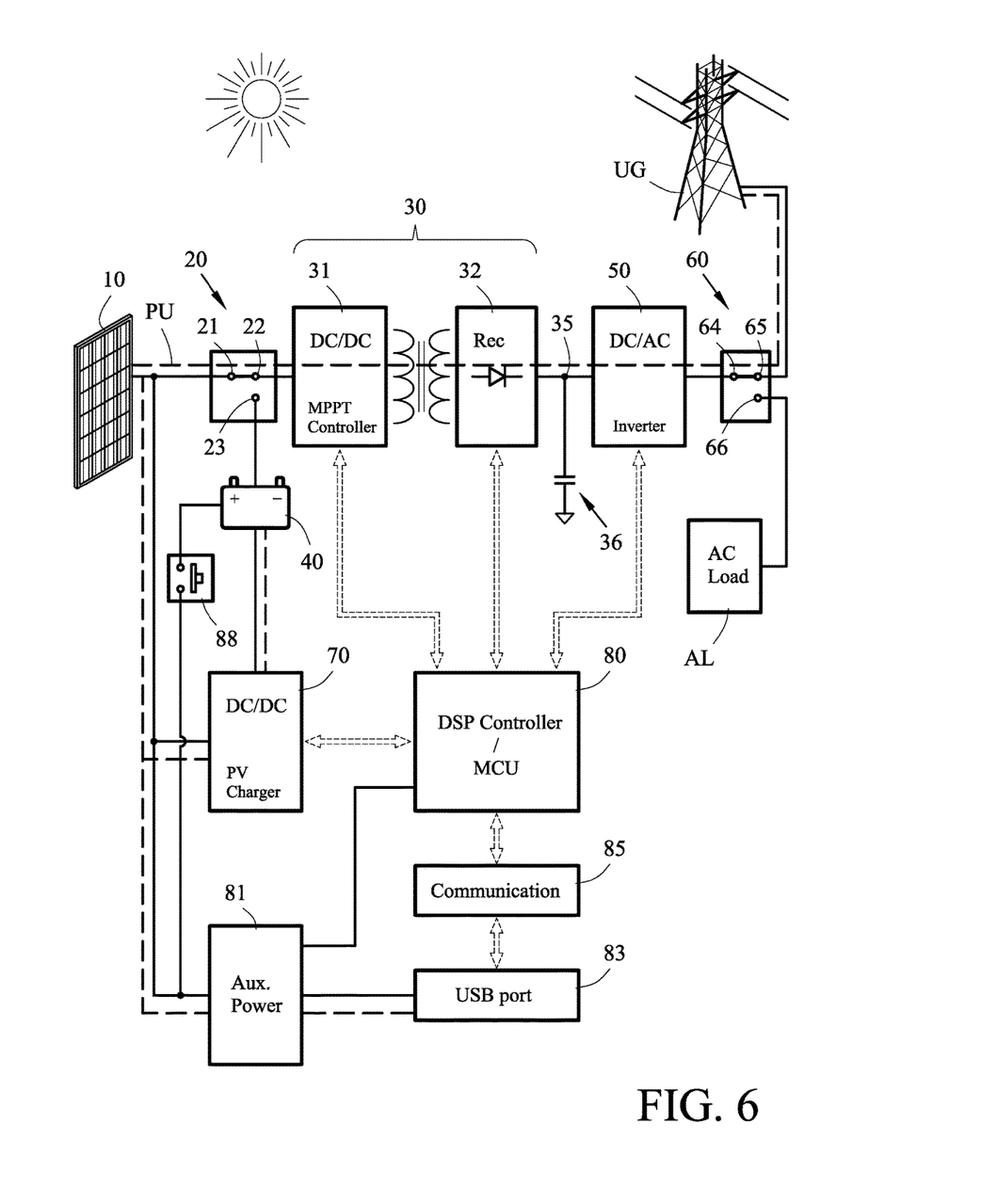
FIG. 6 is a grid-tied path diagram illustrating the second embodiment of the invention.
Figure 7:
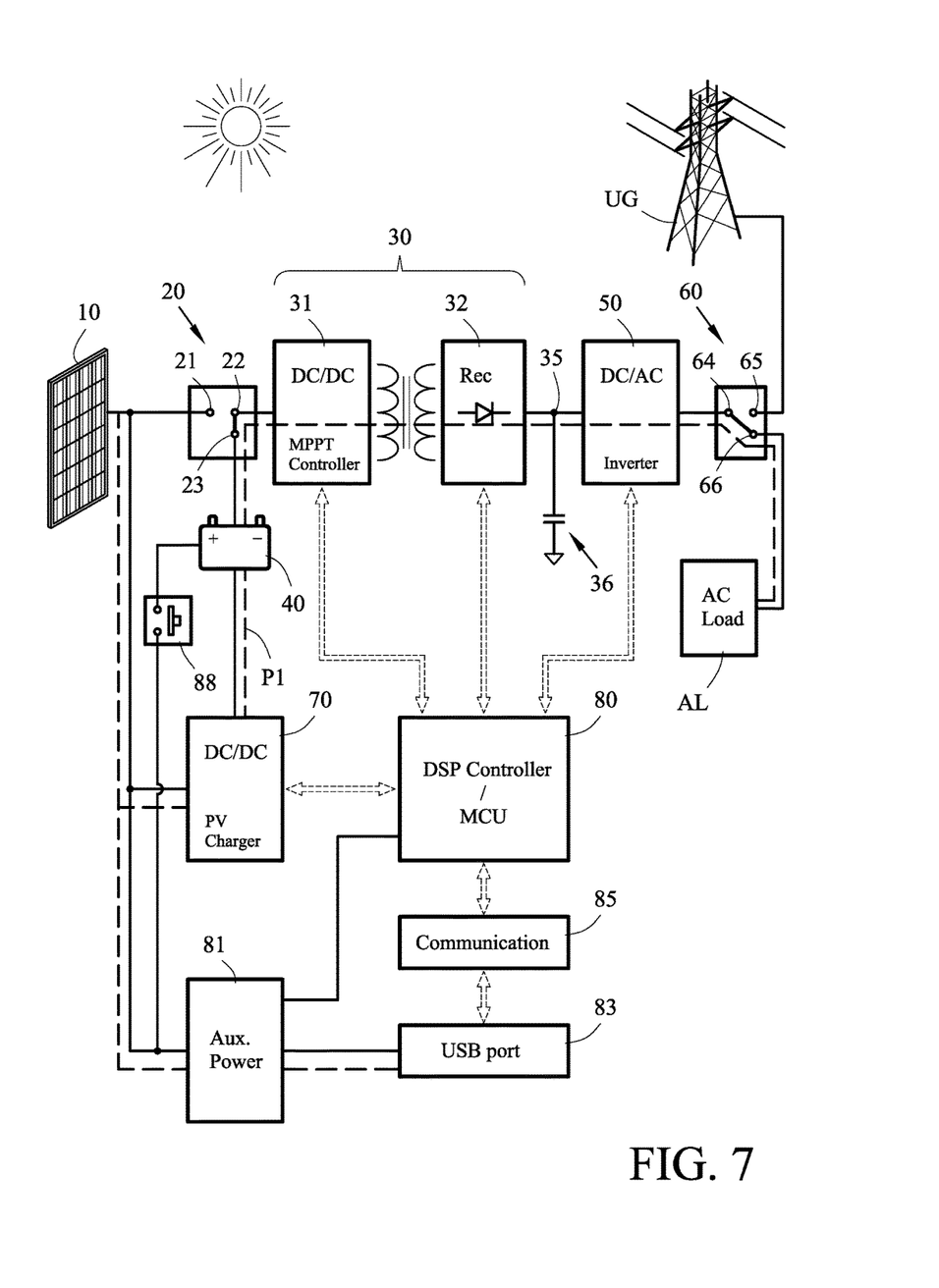
FIG. 7 is a first standalone path diagram illustrating the second embodiment of the invention.
Figure 8:
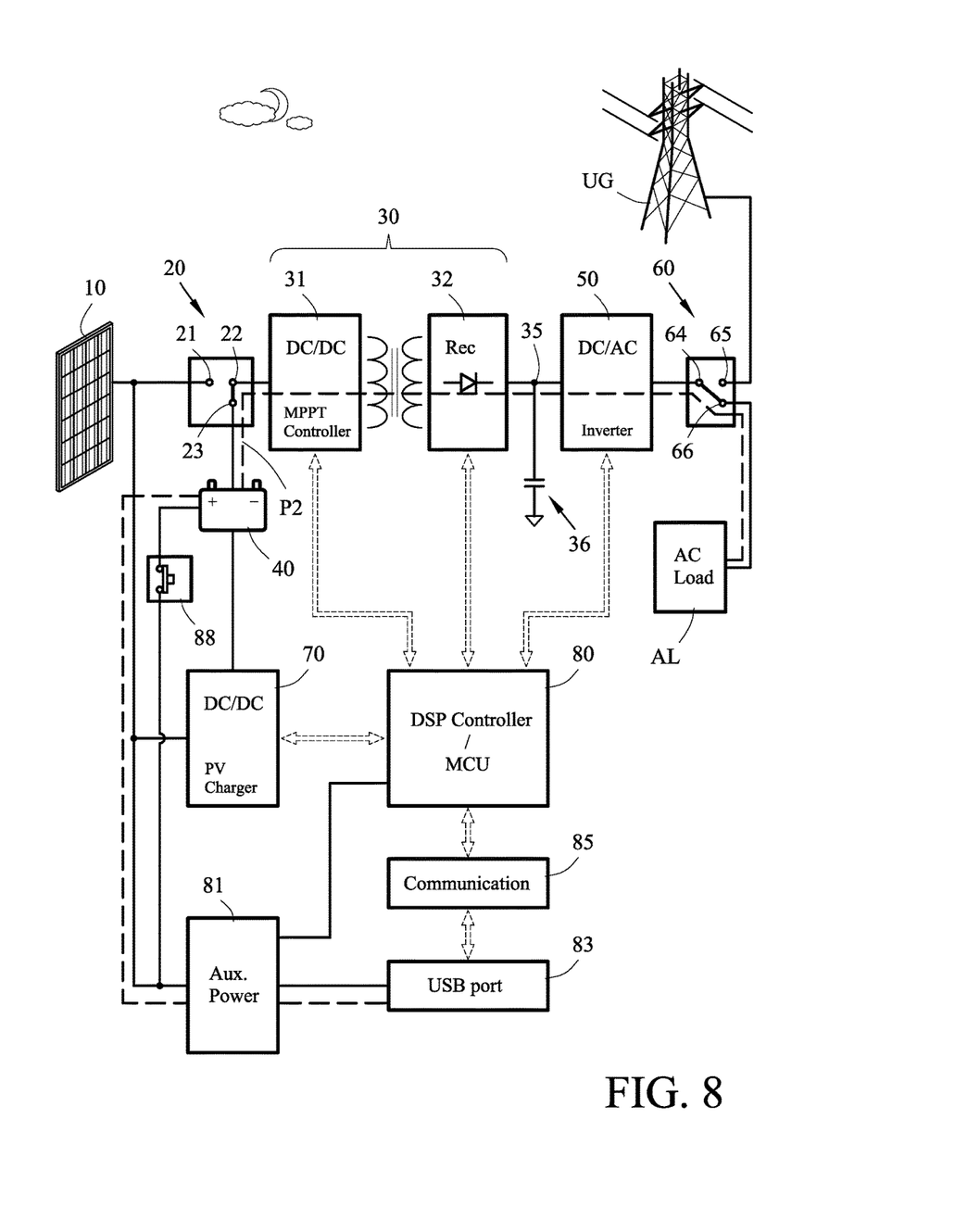
FIG. 8 is a second standalone path diagram illustrating the second embodiment of the invention.

Examples of an executing manner of the grid-tied path PU, the first standalone path P1 and the second standalone path P2, the grid-tied path PU is beginning from the solar panel 10, and then through the first contact 21, the second contact 22 which is connected to the first contact 21, the rectifying control unit 30, the DC to AC inverter 50, the fourth contact 64, and the fifth contact 65 which is connected to the fourth contact 64; the first standalone path P1 is beginning from the solar panel 10, and then through the DC to DC charging unit 70, the rechargeable battery 40, the third contact 23, the second contact 22 which is connected to the third contact 23, the rectifying control unit 30, the DC to AC inverter 50, the fourth contact 64, and the sixth contact 66 which is connected to the fourth contact 64; the second standalone path P2 is beginning from the rechargeable battery 40, and then through the third contact 23, the second contact 22 which is connected to the third contact 23, the rectifying control unit 30, the DC to AC inverter 50, the fourth contact 64, and the sixth contact 66 which is connected to the fourth contact 64.

Examples of an executing manner of the invention system which uses the grid-tied path PU to supply power to the utility grid UG, the system control unit 80 detects the power generation voltage of the solar panel 10; when the power generation voltage of the solar panel 10 is higher than a voltage setting value, the system control unit 80 transmits a first signal to the first switch 20 to connect the first contact 21 and the second contact 22; when a V-bus (bus voltage) value is higher than the voltage value of the utility grid UG, the system control unit 80 transmits a second signal to the second switch 60 to connect the fourth contact 64 and the fifth contact 65, at this time, the invention system uses the grid-tied path PU supply power to the utility grid UG.

Examples of an executing manner of the invention system which uses the grid-tied path PU to supply power to the rechargeable battery 40, the system control unit 80 detects the rechargeable battery 40 to determine whether it exists, and the system control unit 80 detects the power generation status of the solar panel 10; when the rechargeable battery 40 exists, and the power generation status of the solar panel 10 is enough to supply power to charge the rechargeable battery 40, then the system control unit 80 starts the DC to DC charging unit 70 to charge the rechargeable battery 40.

Examples of an executing manner of the invention system which uses the first standalone path P1 to supply power to the AC load AL, the system control unit 80 detects the power generation voltage of the solar panel 10, and the system control unit 80 detects system output to determine whether a utility grid voltage exists; when the power generation voltage of the solar panel 10 is higher than a voltage setting value, and there is no utility grid voltage, the system control unit 80 transmits a third signal to the first switch 20 to connect the third contact 23 and the second contact 22. Moreover, the system control unit 80 detects the rechargeable battery 40 to determine whether it exists; when the rechargeable battery 40 exists, then the system control unit 80 starts the DC to DC charging unit 70 to charge the rechargeable battery 40, and furthermore the system control unit 80 transmits a fourth signal to the second switch 60 to connect the fourth contact 64 and the sixth contact 66, at this time, the invention system uses the first standalone path P1 to supply power to the AC load AL.

Figure 5:
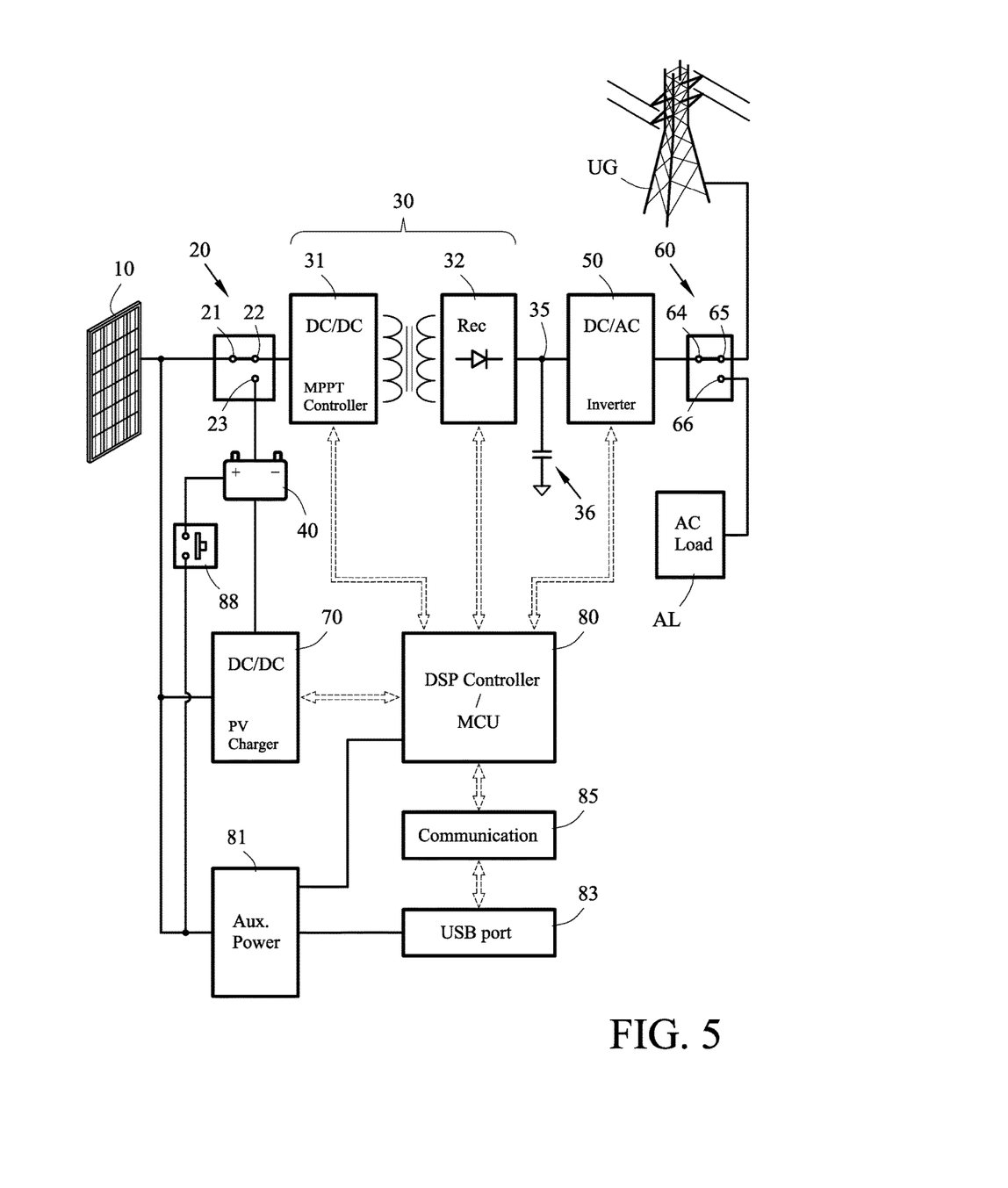
FIG. 5 is a functional block diagram illustrating a second preferred embodiment of the invention.

Examples of an executing manner of the third switch 88, the third switch 88 can be a manual switch, the third switch 88 is selected from a rocker switch, a push switch, a toggle switch, a DIP switch or a touch switch. When a user operates the third switch 88 to the ON status, the Aux power unit 81 transforms the partial power of the rechargeable battery 40, therefore the Aux power unit 81 supplies power to the system control unit 80. When a user operates the third switch 88 to the OFF status, the Aux power unit 81 transforms the partial power which is generated from the solar panel 10, therefore the Aux power unit 81 supplies power to the system control unit 80.

Examples of an executing manner of the invention system which uses the second standalone path P2 to supply power to the AC load AL, the system control unit 80 detects the power generation voltage of the solar panel 10; when the solar panel 10 is not generating power, the system control unit 80 controls the DC to DC charging unit 70 to stop charging the rechargeable battery 40, the system control unit 80 transmits a third signal to the first switch 20 to connect the third contact 23 and the second contact 22, and the system control unit 80 transmits a fourth signal to the second switch 60 to connect the fourth contact 64 and the sixth contact 66, at this time, the invention system uses the second standalone path P2 to supply power to the AC load AL.

Examples of another executing manner of the Aux power unit 81, the Aux power unit 81 electrically connects at least one USB port 83; a communication unit 85 is disposed between the system control unit 80 and the USB port 83, therefore the USB port 83 supplies power to charge an external device (not shown).

What is claimed is:
1. A hybrid solar power generation system, the power generation system comprising:
at least one solar panel (10);
at least one first switch (20) electrically connected to the solar panel (10);
a rectifying control unit (30) electrically connected to the first switch (20);
at least one rechargeable battery (40) electrically connected to the first switch (20);
a DC to AC inverter (50) electrically connected to the rectifying control unit (30);
at least one second switch (60) electrically connected to the DC to AC inverter (50), a utility grid (UG) and an AC load (AL);
a DC to DC charging unit (70) parallelly connected to the solar panel (10), the rechargeable battery (40) is charged by the DC to DC charging unit (70); and
a system control unit (80), the system control unit (80) controls the first switch (20), the rectifying control unit (30), the DC to AC inverter (50), the second switch (60) and the DC to DC charging unit (70);
wherein the system control unit (80) controls the first switch (20) and the second switch (60) to form either a grid-tied path (PU) or a first standalone path (P1), the solar panel (10) supplies power to the utility grid (UG) by the grid-tied path (PU) or to the AC load (AL) by the first standalone path (P1),
wherein an Aux power (Auxiliary power) unit (81) is parallel connected to the solar panel (10) and the rechargeable battery (40); at least one unidirectional diode (84) is disposed between the rechargeable battery (40) and the Aux power unit (81), therefore the rechargeable battery (40) and the Aux power unit (81) conducts current only in one direction; when the solar panel (10) is generating power, the Aux power unit (81) transforms the power which is generated from the solar panel (10), therefore the Aux power unit (81) supplies power to the system control unit (80); when the solar panel (10) is not generating power, the Aux power unit (81) transforms the partial power of the rechargeable battery (40), therefore the Aux power unit (81) supplies power to the system control unit (80).

2. The hybrid solar power generation system of claim 1, wherein the first switch (20) has a first contact (21), a second contact (22) and a third contact (23); the first contact (21) is electrically connected to the solar panel (10), the second contact (22) is electrically connected to the rectifying control unit (30), the third contact (23) is electrically connected to the rechargeable battery (40); the second switch (60) has a fourth contact (64), a fifth contact (65) and a sixth contact (66); the fourth contact (64) is electrically connected to the DC to AC inverter (50), the fifth contact (65) is electrically connected to the utility grid (UG), the sixth contact (66) is electrically connected to the AC load (AL).

3. The hybrid solar power generation system of claim 2, wherein the grid-tied path (PU) is beginning from the solar panel (10), and then through the first contact (21), the second contact (22) which is connected to the first contact (21), the rectifying control unit (30), the DC to AC inverter (50), the fourth contact (64), and the fifth contact (65) which is connected to the fourth contact (64); the first standalone path (P1) is beginning from the solar panel (10), and then through the DC to DC charging unit (70), the rechargeable battery (40), the third contact (23), the second contact (22) which is connected to the third contact (23), the rectifying control unit (30), the DC to AC inverter (50), the fourth contact (64), and the sixth contact (66) which is connected to the fourth contact (64).

4. The hybrid solar power generation system of claim 2, wherein the system control unit (80) controls a second standalone path (P2) which is formed by the first switch (20) and the second switch (60); the rechargeable battery (40) supplies power to the AC load (AL) by the second standalone path (P2); the second standalone path (P2) is beginning from the rechargeable battery (40), and then through the third contact (23), the second contact (22) which is connected to the third contact (23), the rectifying control unit (30), the DC to AC inverter (50), the fourth contact (64), and the sixth contact (66) which is connected to the fourth contact (64).

5. The hybrid solar power generation system of claim 2, wherein the system control unit (80) is selected from a DSP (Digital Signal Processor) or a MCU (Microcontroller Unit), the rectifying control unit (30) has a MPPT (Maximum Power Point Tracking) controller (31) and a rectifying circuit (32); the MPPT controller (31) is electrically connected to the second contact (22), the rectifying circuit (32) is electrically connected to the DC to AC inverter (50); a V-bus (bus voltage) terminal (35) is located between the rectifying control unit (30) and the DC to AC inverter (50), the V-bus terminal (35) is electrically connected to an electric capacitor (36).

6. The hybrid solar power generation system of claim 1, wherein the Aux power unit (81) electrically connects at least one USB (Universal Serial Bus) port (83); a communication unit (85) is disposed between the system control unit (80) and the USB port (83), therefore the USB port (83) supplies power to charge an external device.

7. A hybrid solar power generation system, the power generation system comprising:
at least one solar panel (10);
at least one first switch (20) electrically connected to the solar panel (10);
a rectifying control unit (30) electrically connected to the first switch (20);
at least one rechargeable battery (40) electrically connected to the first switch (20);
a DC to AC inverter (50) electrically connected to the rectifying control unit (30);
at least one second switch (60) electrically connected to the DC to AC inverter (50), a utility grid (UG) and an AC load (AL);
a DC to DC charging unit (70) parallelly connected to the solar panel (10), the rechargeable battery (40) is charged by the DC to DC charging unit (70); and
a system control unit (80), the system control unit (80) controls the first switch (20), the rectifying control unit (30), the DC to AC inverter (50), the second switch (60) and the DC to DC charging unit (70);
an Aux power unit (81) parallelly connected to the solar panel (10) and the rechargeable battery (40);
at least one third switch (88), the third switch (88) is disposed between the rechargeable battery (40) and the Aux power unit (81);
wherein the Aux power unit (81) transforms power from at least one of the rechargeable battery (40) and the solar panel (10) and supplies the power transformed by the Aux power unit (81) to the system control unit (80), the third switch (88) switches the connection of the rechargeable battery (40) and the Aux power unit (81), the system control unit (80) controls the first switch (20), the second switch (60) and the third switch (88) to form one of a grid-tied path (PU), a first standalone path (P1) or a second standalone path (P2), and the solar panel (10) supplies power either to the utility grid (UG) by the grid-tied path (PU) or to the AC load (AL) by the first standalone path (P1).

8. The hybrid solar power generation system of claim 7, wherein the first switch (20) has a first contact (21), a second contact (22) and a third contact (23); the first contact (21) is electrically connected to the solar panel (10), the second contact (22) is electrically connected to the rectifying control unit (30), the third contact (23) is electrically connected to the rechargeable battery (40); the second switch (60) has a fourth contact (64), a fifth contact (65) and a sixth contact (66); the fourth contact (64) is electrically connected to the DC to AC inverter (50), the fifth contact (65) is electrically connected to the utility grid (UG), the sixth contact (66) is electrically connected to the AC load (AL).

9. The hybrid solar power generation system of claim 8, wherein the grid-tied path (PU) is beginning from the solar panel (10), and then through the first contact (21), the second contact (22) which is connected to the first contact (21), the rectifying control unit (30), the DC to AC inverter (50), the fourth contact (64), and the fifth contact (65) which is connected to the fourth contact (64); the first standalone path (P1) is beginning from the solar panel (10), and then through the DC to DC charging unit (70), the rechargeable battery (40), the third contact (23), the second contact (22) which is connected to the third contact (23), the rectifying control unit (30), the DC to AC inverter (50), the fourth contact (64), and the sixth contact (66) which is connected to the fourth contact (64); the second standalone path (P2) is beginning from the rechargeable battery (40), and then through the third contact (23), the second contact (22) which is connected to the third contact (23), the rectifying control unit (30), the DC to AC inverter (50), the fourth contact (64), and the sixth contact (66) which is connected to the fourth contact (64).

10. The hybrid solar power generation system of claim 9, wherein the system control unit (80) detects the power generation voltage of the solar panel (10); when the power generation voltage of the solar panel (10) is higher than a voltage setting value, the system control unit 80 transmits a first signal to the first switch (20) to connect the first contact (21) and the second contact (22); when a V-bus (bus voltage)

value is higher than the voltage value of the utility grid (UG), the system control unit (80) transmits a second signal to the second switch (60) to connect the fourth contact (64) and the fifth contact (65), therefore the power generation system uses the grid-tied path (PU) supply power to the utility grid (UG).

11. The hybrid solar power generation system of claim 9, wherein the system control unit (80) detects the rechargeable battery (40) to determine whether the rechargeable battery exists, and the system control unit (80) detects the power generation status of the solar panel (10); when the rechargeable battery (40) exists, and the power generation status of the solar panel (10) is enough to supply power to charge the rechargeable battery (40), then the system control unit (80) starts the DC to DC charging unit (70) to charge the rechargeable battery (40).

12. The hybrid solar power generation system of claim 9, wherein the system control unit (80) detects the power generation voltage of the solar panel (10), and the system control unit (80) detects system output to determine whether a utility grid voltage exists; when the power generation voltage of the solar panel (10) is higher than a voltage setting value, and there is no utility grid voltage, the system control unit (80) transmits a third signal to the first switch (20) to connect the third contact (23) and the second contact (22); the system control unit (80) detects the rechargeable battery (40) to determine whether the rechargeable battery exists; when the rechargeable battery (40) exists, then the system control unit (80) starts the DC to DC charging unit (70) to charge the rechargeable battery (40), and furthermore the system control unit (80) transmits a fourth signal to the second switch (60) to connect the fourth contact (64) and the sixth contact (66), therefore the power generation system supplies power to the AC load (AL).

13. The hybrid solar power generation system of claim 9, wherein the system control unit (80) detects the power generation voltage of the solar panel (10); when the solar panel (10) is not generating power, the system control unit (80) controls the DC to DC charging unit (70) to stop charging the rechargeable battery (40), the system control unit (80) transmits a third signal to the first switch (20) to connect the third contact (23) and the second contact (22), and the system control unit (80) transmits a fourth signal to the second switch (60) to connect the fourth contact (64) and the sixth contact (66), therefore the hybrid solar power generation system supplies power to the AC load (AL).

14. The hybrid solar power generation system of claim 7, wherein the third switch (88) includes a manual switch, the third switch (88) is selected from a rocker switch, a push switch, a toggle switch, a DIP switch or a touch switch; when a user operates the third switch (88) to the ON status, the Aux power unit (81) transforms the power of the rechargeable battery (40) to supply power to the system control unit (80); when a user operates the third switch (88) to the OFF status, the Aux power unit (81) transforms the power which is generated from the solar panel (10), therefore the Aux power unit (81) supplies power to the system control unit (80).

15. The hybrid solar power generation system of claim 7, wherein the Aux power unit (81) electrically connects at least one USB port (83); a communication unit (85) is disposed between the system control unit (80) and the USB port (83), therefore the USB port (83) supplies power to charge an external device.

\* \* \* \* \*